(12) United States Patent
Renner

(10) Patent No.: US 12,263,701 B2
(45) Date of Patent: Apr. 1, 2025

(54) WHEEL FOR A VEHICLE

(71) Applicant: MUBEA CARBO TECH GMBH, Salzburg (AT)

(72) Inventor: Christoph Renner, Gosau (AT)

(73) Assignee: MUBEA CARBO TECH GMBH, Salzburg (AT)

( * ) Notice: Subject to any disclaimer, the term of this patent is extended or adjusted under 35 U.S.C. 154(b) by 761 days.

(21) Appl. No.: 17/428,452

(22) PCT Filed: Mar. 17, 2020

(86) PCT No.: PCT/EP2020/057242
§ 371 (c)(1),
(2) Date: Aug. 4, 2021

(87) PCT Pub. No.: WO2020/187892
PCT Pub. Date: Sep. 24, 2020

(65) Prior Publication Data
US 2022/0126624 A1   Apr. 28, 2022

(30) Foreign Application Priority Data
Mar. 20, 2019   (CH) .................................. 00366/19

(51) Int. Cl.
*B60B 7/02*   (2006.01)
*B60B 3/00*   (2006.01)
(Continued)

(52) U.S. Cl.
CPC ................ *B60B 7/02* (2013.01); *B60B 3/004* (2013.01); *B60B 3/02* (2013.01); *B60B 3/10* (2013.01);
(Continued)

(58) Field of Classification Search
CPC .. B60B 3/004; B60B 3/02; B60B 3/10; B60B 5/02; B60B 5/7066; B60B 7/068; B60B 7/0013
See application file for complete search history.

(56) References Cited

U.S. PATENT DOCUMENTS 3,861,435 A * 1/1975 Vincent ................... B60B 19/00
152/5
4,530,542 A * 7/1985 Spiegel ..................... B60B 3/06
301/37.11
(Continued)

FOREIGN PATENT DOCUMENTS

CN   101378914 A   3/2009
CN   103974834 A   8/2014
(Continued)

OTHER PUBLICATIONS

EPO (Riswijk, NL). English language version of the International Search Report, Form PCT/ISA/210, for International Application PCT/EP2020/057242, Jul. 2, 2020 (3 pages).
(Continued)

*Primary Examiner* — Jason R Bellinger
(74) *Attorney, Agent, or Firm* — Pauley Erickson & Swanson

(57) ABSTRACT

A wheel (1) for a vehicle and a related method for manufacturing the wheel includes a rim (2) and a wheel center (3). The wheel center includes several spokes (4) extending from a hub (5), with a center opening (6), radially outwards to the rim (2). The hub (5) is made from a fiber-reinforced plastic material and is covered on the outboard side from a three-dimensionally shaped support cover (7) made from metallic material.

11 Claims, 3 Drawing Sheets

(51) Int. Cl.
  *B60B 3/02* (2006.01)
  *B60B 3/10* (2006.01)
  *B60B 5/02* (2006.01)
  *B60B 7/06* (2006.01)
  *B60B 1/06* (2006.01)

(52) U.S. Cl.
  CPC ............... *B60B 5/02* (2013.01); *B60B 7/066* (2013.01); *B60B 1/06* (2013.01)

(56) References Cited

U.S. PATENT DOCUMENTS

| | | | |
|---|---|---|---|
| 6,302,494 B1* | 10/2001 | DiMarco | B60B 7/04 301/37.42 |
| 2002/0117888 A1* | 8/2002 | Wurft | B60B 3/16 301/35.632 |
| 2004/0036348 A1 | 2/2004 | Schroeder et al. | |
| 2004/0255462 A1 | 12/2004 | Schroeder et al. | |
| 2013/0221731 A1* | 8/2013 | Hess | B29C 45/006 301/37.101 |
| 2014/0103701 A1* | 4/2014 | Chung | B60B 7/066 29/894.36 |
| 2017/0058994 A1* | 3/2017 | Lim | B60B 7/04 |
| 2017/0087931 A1 | 3/2017 | Gaylo et al. | |
| 2023/0014748 A1* | 1/2023 | Werner | B29C 70/48 |

FOREIGN PATENT DOCUMENTS

| | | |
|---|---|---|
| CN | 105452012 A | 3/2016 |
| CN | 107009815 A | 8/2017 |
| DE | 10 2014 226 147 A1 | 6/2016 |
| JP | 2015-505767 A | 2/2015 |
| JP | 2020-531343 A | 11/2020 |
| WO | WO 2013/000009 A1 | 1/2013 |
| WO | WO 2015/027271 A1 | 3/2015 |
| WO | WO 2018/153528 A1 | 8/2018 |
| WO | WO 2020/038534 A2 | 2/2020 |

OTHER PUBLICATIONS

JPO, Notice of Reasons for Refusal, Japanese Patent Application No. JP 2021-553083, dated Dec. 6, 2023 (4 pp.) and the English Translation (5 pp.).

PRC, National Intellectual Property Administration, "First Office Action and Search Report," Chinese Patent Application No. 202080019425.0, Mailed Jun. 16, 2023, 12 pages.

* cited by examiner

WHEEL FOR A VEHICLE

CROSS REFERENCE TO RELATED APPLICATION

This application is a National Phase filing in the United States, under 35 USC § 371, of PCT International Patent Application PCT/EP2020/057242, filed on 17 Mar. 2020 which claims the priority of Swiss Patent Application CH 00366/19, filed 20 Mar. 2019.

These applications are hereby incorporated by reference herein in their entirety and is made a part hereof, including but not limited to those portions which specifically appear hereinafter.

BACKGROUND OF THE INVENTION

Field of the Invention

The present invention relates to a wheel made at least partially from a fiber-reinforced plastic material. The present invention relates further to a method for manufacturing such a wheel.

Discussion of Related Art

Wheels for vehicles made at least partially from fiber-reinforced plastic material are known from the prior art.

WO 2015/027271 A1 was published on 5 Mar. 2015 on behalf of Carbon Revolution PTY Ltd and discloses a center-lock attachment arrangement attaching a composite wheel to a mount using a center-lock fastener and a center-lock fastening nut, which can be fastened on the center-lock fastener. The composite wheel includes a central attachment area that has a central attachment aperture through which the center-lock fastener is inserted. As well it includes a front element having an attachment aperture through which the center-lock fastener is inserted and a backing element including an attachment aperture through which the center-lock fastener is inserted. The document further discloses a plurality of fastener apertures that are annularly spaced around the attachment aperture of the composite wheel, the front element and the backing element. In use, a plurality of elongate fasteners configured to be received through the aligned apertures of the front element and the backing element clamp the front and the backing element over and around the central attachment area of the composite wheel.

WO 2013/000009 A1 was published on 3 Jan. 2013 on behalf of Carbon Revolution PTY Ltd and discloses an attachment arrangement for use in attaching a composite wheel to a mount using elongate fastener elements and fastening nuts, which can be fastened on the elongate fastener elements. The attachment arrangement is used with a composite wheel that includes at least one attachment aperture through which the elongate fastener element is inserted. The attachment arrangement includes a fastening washer that has a fastening aperture through which the elongate fastener element can be inserted when in use. The fastening aperture includes a radially central fastening axis. The fastening washer also has a base configured to face a surface of the composite wheel about the attachment aperture. In addition, the fastening washer has a fastening side facing substantially axially outwardly from the attachment aperture. The fastening side includes at least one engagement surface configured to operatively engage a complementary portion of the fastening nut when the fastening nut is assembled on the elongate fastener element. The fastening arrangement also includes a sleeve which extends axially relative to the fastening axis outwardly from the base about the fastening aperture. The sleeve is configured to extend into the attachment aperture of the composite wheel. The sleeve also includes a distal end configured to be received in a complementary shaped sleeve aperture located in the mount or in an element located adjacent the mount.

SUMMARY OF THE INVENTION

In order to minimize the total mass of a vehicle wheel, wheels have been developed which are least partially made from fiber-reinforced plastic material, comprising e.g. glass fibers, carbon fibers, aramid fibers, basalt fibers or combinations thereof as reinforcing fibers embedded in plastic material.

These types of wheels require in many cases special measures in order to prevent corrosion phenomena between different materials as well as to prevent stress concentration (respectively to obtain an even stress and strain distribution) in the areas where different materials come together. Hence, the attachment of these wheels to a vehicle's hub often turns out to be critical, as an efficient load transfer is required from a vehicle's hub into the wheel's hub region and from there in the surrounding region of the wheel center into the rim.

In one aspect, the present invention is directed to a wheel with an improved hub to attach the wheel to a vehicle. The improved hub comprises a support cover preferably made from metallic material or an alternative homogenous material. The support cover is usually forming an integral part of the hub which is supporting a section of the hub made from a fiber-reinforced plastic material. This assists in obtaining a mechanically advantageous load transfer between the fastening means and the wheel. Furthermore, the stress/strain distribution at the hub can be improved.

A wheel according to the invention comprises a rim and a wheel center having several spokes extending from the hub radially outwards to the rim. The rim has a rim well extending in transversal direction (direction of the axis of rotation of the wheel) between an inboard flange and an outboard flange suitable to receive a tire to be mounted thereon. The wheel center is preferably made from fiber-reinforced plastic material. The hub comprises at least one fastening opening by which the wheel is intended to be interconnected with an inboard side of the wheel to a corresponding hub of a vehicle. For mounting the wheel to a vehicle, at least one fastening mean, such as e.g. a bolt or a screw is inserted through the respective fastening opening. The hub further comprises a center opening for the interconnection.

In a preferred variation, the hub is supported on an outboard side from a three-dimensionally shaped support cover made from metallic material. Depending on the application, the support cover may comprise at least one wing which further extends at least partially into a spoke and/or in the space between the spokes. For reasons of the mass inertia, the support cover preferably extends into all spokes or into a different number of spokes, evenly distributed around the circumference of the wheel. If multiple wings extending along the respective spokes are present, the support cover has an overall star-like or stellar-like shape.

The support cover is preferably integrated in the outer contour of the wheel center. Therefore, the support cover may be embedded in the wheel structure such that a continuous outer surface of wheel is maintained and the support cover does not significantly extend over the contour of the wheel such that local peak loads are avoided. Furthermore, the fiber-reinforced material of the hub can comprise a (outboard) recess in which the three-dimensionally shaped support cover can be arranged. Thereby the support cover may further be protected respectively covered by an additional part of additional layer of material from the outside of the wheel.

The support cover may encompass the center opening and/or at least one fastening opening of the hub foreseen to receive the fastening means. The support cover may be ring-shaped around the central opening encompassing multiple fastening openings of the hub. In a variation, the support cover may comprise a center flange at least partially encompassing the center opening. Advantageously, the center flange extends partially into the central opening of the wheel in the assembled state.

The support cover may further comprise channel-like recesses in which fiber-reinforced material is arranged extending from the hub into the spokes and supporting the fiber-reinforced material from the outside. Preferably, the center flange, as explained above, is set back into the wheel in the transversal direction with respect to the channel like recesses. The channel-like recesses may have a rectangular or trapezoidal cross section (being open at one side) with at least two side surfaces extending in the radial direction. However, other shapes of the cross-section are also possible. Advantageously, the support cover may form undercuts in the transversal direction with the fiber-reinforced plastic material, e.g., the support cover around the channel-like recesses may have a clamp-shaped cross-section in the radial direction, clamping partially around the wheel center or part of the spoke by forming undercuts on both side surfaces of the at least one channel like recess in the transversal direction. An arrangement where the support cover forms at least one undercut is advantageous, as it may allow to compensate for minor angular misalignments occurring during service life of the wheel due to thermal expansion, creeping or other effects.

The support cover preferably merges into at least one first bushing, which extends at least partially through the fiber-reinforced plastic material of the hub in the transversal direction. The at least one first bushing may be an integral part of the support cover or may be a separate part interconnected to the support cover. In the assembled state of the wheel, the at least one first bushing is arranged in a respective bushing-opening of the fiber-reinforced plastic material of the hub and advantageously surrounds the fastening opening. Multiple first bushings, respectively multiple bushing-openings can be arranged in the circumferential direction around the central opening. The multiple first bushings may further be arranged in the assembled state in the circumferential direction between the spokes of the wheel. Depending on the design of the wheel, the first bushings may however be arranged in circumferential direction also at different positions.

In a variation of the invention, the at least one first bushing has a conical (first) outer surface which interacts in the assembled position with a corresponding (first) inner surface of the bushing-openings of the fiber-reinforced material of the hub. During insertion of the at least one first bushing in the bushing-opening a widening of the bushing-opening can be obtained, without implementing too much deformation in the transversal direction. The widening of the bushing-openings results in a pre-tensioning of the fibers of the wheel center, thereby further stabilizing the wheel center and improving the load transfer, as explained further below.

Preferably, the at least one (first) outer surface of the first bushing has an essentially frusto-conical shape having an outer opening angle of between 5° and 20° (degree of arc), inducing a particular even widening. Particularly good results may be obtained if an outer opening angle of about 10° (degree of arc) is used.

According to a variation of the invention, the at least one (first) inner surface of the bushing-opening has an essentially frusto-conical shape having an inner opening angle that is essentially equal to the outer opening angle. However, depending on the application, the inner opening angle may also deviate from the outer opening angle, such as e.g. by plus or minus 5° (degree of arc).

According to a variation of the invention, the wheel center comprises reinforcing fibers arranged in the plastic material, with the fibers at least partially encircling the at least one first busing of the outboard support cover. The reinforcing fibers may e.g. emerge from one spoke, partially encircle the first bushing and continue in a neighboring spoke, e.g., the reinforcing fibers arranged in the (fiber-reinforced) plastic material may encircle the at least one first bushing by at least 240°. This may be advantageous, if the first bushing is located between the spokes. If the at least one first bushing is orientated in the circumferential direction at the same position than the spoke, the reinforcing fibers may also emerge from one spoke, partially or fully encircle the first bushing before returning into the same spoke. Depending on the application, the fibers may also encircle the first bushings multiple times. Furthermore, the first bushings may be encircled from different fibers in different ways. Additional reinforcing-fibers may encircle multiple first bushings from the radial outside, stabilizing the structure even further. Preferably, the reinforcing fibers encircling the at least one first bushing form at least one bundle of fibers which may e.g., be or be part of a roving or a tape or a fabric or a braided structure. Due to the widening of the bushing-openings a pre-tensioning of the reinforcing fibers can be obtained. Depending on the circumferential position of the bushing-openings around the central opening, the outboard support cover may thus be pre-tensioned evenly around the circumference and in the radial direction. The pre-tensioning of the fibers improves the stress/strain distribution at the hub and positively affects the load transfer into the hub.

In a variation, first and the second end portions of the reinforcing fibers or reinforcing fibers bundles partially encompassing the at least one first bushing may extend in different spokes of the wheel towards the rim of the wheel. Alternatively or in addition, they may extend in the same spoke of the wheel towards the rim of the wheel. For some types of a wheel, the first and a second end portion extend further in the radial direction of the wheel towards or even into the rim of the wheel. A mechanically particularly advantageous wheel may be obtained if the first and the second end portions extend to the rim via a circumferential collar of the rim.

Particularly good results may be obtained if at least some of the fibers or the bundle of fibers are arranged at a distance of less than 5 mm (millimeters), preferably less than 2 mm from the at least one (first) inner surface of the bushing-opening. For some application at least some fibers or the at least one bundle of fibers may be aligned directly at the (first) inner surface.

Alternatively or in addition, the wheel may comprise an inboard support cover, covering the hub from the inboard side of the wheel. The inboard cover may have a three-dimensional shape. Equivalent to the outboard support cover, the inboard support cover is advantageously integrated into the outer contour of the inboard side of the wheel center. Therefore, the inboard cover may be embedded in the wheel structure with the fiber-reinforced material of the hub comprising a corresponding (inboard) recess in which the inboard cover is embedded. However, due to the fact, that the hub is foreseen to be interconnected to the vehicle on the inboard side, the inboard support cover has advantageously a (flat) interconnection surface for the interconnection on the vehicle hub from which second bushings may extend as explained below. Furthermore, the inboard support cover may feature an additional central flange around the central opening and/or a circumferential flange on the radial outer end of the inboard support cover extending in the outboard direction.

Good results may be obtained if the inboard support cover comprises at least one second bushing, which extends at least partially through the fiber-reinforced plastic material of the hub from the inboard side of the wheel into the bushing-opening. The at least one second bushing may be an integral part of the inboard support cover or may be a separate part interconnected to the inboard support cover. Preferably the outboard support cover and the inboard support cover have the same amount of first, respectively second bushings with the respectively first and second bushings being arranged concentric to each other. The first and the second bushing are configured to be inserted into the busing opening from different sides respectively.

In a variation of the invention, the outboard support cover comprises at least one first bushing, wherein the inboard support cover comprises at least one corresponding second bushing. The at least one first bushing comprises a first outer surface that is configured to apply a first expanding force on the first inner surface of the bushing-opening. Alternatively or in addition, the second bushing comprises a second outer surface configured to apply a second expanding force on a second inner surface of the bushing-opening. Within this context, the first and/or the second bushing may also have a cylindrically-shaped (first and/or the second) outer surface which does not apply any expanding force on the respective (first and/or the second) inner surface of the bushing-opening. The first outer surface of the first bushing may also have an essentially frusto-conical shape, as explained above. In such a variation, the first inner surface of the bushing-opening has an essentially frusto-conical shape having a first inner opening angle that is essentially equal to the first outer opening angle. Particularly good results may be obtained if the first outer opening angle is about 10° (degree of arc). In a variation of the invention, the second outer surface of the second bushing has an essentially frusto-conical shape having a second outer opening angle of between 5° and 20° (degree of arc). In such a variation, the second inner surface of the bushing-opening has an essentially frusto-conical shape having a second inner opening angle that is essentially equal to the second outer opening angle. Particularly good results may be obtained if the second outer opening angle is about 10°. Depending on the type of wheel, the first and the second outer opening angles may be equal or may be different angles.

Alternatively or in addition to a frusto-conical shape, the (first and/or the second) outer surface and/or the (first and/or the second) inner surface may also have a curved profile, respectively the (first and/or the second) outer bushing diameter may change in the transversal direction in a non-linear way. Although if compared to a frusto-conical bushing such a variation will typically be more complicated to be manufactured. Such (two-dimensionally) curved surfaces will allow to obtain a highly specific widening of the bushing-opening and hence also stress/strain distribution in the surrounding wheel center.

In order to improve alignment of the first and the second bushing relatively to each other as well as to prevent unwanted stress concentration, the first bushing may comprise a first from face to be arranged in an assembled state within the bushing-opening and which has a convex shape and wherein the second bushing comprises a second front face to be arranged in an assembled state within the bushing-opening and which has a concave shape arranged to receive the first front face. Thus, the first and the second bushing can be aligned with each other. It is clear that alternatively, the first front face may have a concave shape and the second front face may have a corresponding convex shape. Depending on the application, the first and second front face may however have other shapes such as straight directly adjacent faces. For some applications, the first and the second bushing may be mechanically interconnected with each other by an adhesive or a threaded connection; for other applications, the first and respective second bushings may be releasable from each other or even spaced a distance apart.

Preferably, the outboard support cover and/or the inboard support cover are made from a lightweight metal such as aluminum, magnesium or titanium. Within the context of the present invention, "aluminum", "magnesium" and "titanium" should be understood as meaning also their alloys. Alternatively, the outboard support cover and/or the inboard support cover may be made from another homogenous material such as e.g., polyetheretherketone (PEEK). For reasons of corrosion phenomena between the different materials of the support covers and the fiber-reinforced plastic material, as well as to prevent stress concentration, the hub may comprise an additional intermediate layer. The intermediate layer may be arranged between the outboard support cover and the fiber-reinforced plastic material and/or the inboard support cover and the fiber-reinforced plastic material. The intermediate layer may comprise an electrically insulating material, which allows further reduction—respectively prevention—of contact corrosion phenomena. Such an electrically insulating material may be a plastic material. Preferably, the insulating material is further a high temperature resistant material. Suitable materials may be e.g., polyphenylene sulfide (PPS) or polyphthalamide (PPA) or polyetherketones (PEK) (e.g., polyetheretherketone (PEEK), polyetherketoneketone (PEKK), poly(etherketoneetherketoneketone) (PEKEKK), polyetheretherketoneketone (PEEKK)). However, also materials such as for example polystyrene (PS), polypropylene (PP), high-density polyethylene (HDPE) and low-density polyethylene (LDPE), polytetrafluoroethylene (PTFE), polyethylene terephthalate (PET) or polyamides (PA) are suitable materials. Furthermore, materials such as glass, ceramics or basalt may be used. For example, the intermediate layer may comprise a fabric made from glass or basalt fibers or a composite structure reinforced by these fibers. Using glass or basalt fibers may be advantageous for providing good electrical insulation.

In a variation of the invention, the outboard support cover may be combined with multiple individual bushings inserted into the bushing-openings from the inboard side respectively. The front faces of the first bushings of the support cover and the individual bushings may be designed equivalent to the front faces as explained above.

In a variation of the invention, at least one intermediate bushing may be arranged between the outboard and the inboard support cover. The intermediate bushing being either part of the outboard or the inboard support cover or a separate element interconnected to either of the support covers. These intermediate bushings may have the same shape and function as the first and/or the second bushings, as explained above.

The manufacturing process of a wheel with an outboard and/or an inboard support cover, as described above, may comprise the following method steps: Providing a mold comprising an upper and a lower part which corresponds at least partially to the outside of the wheel. At least one mold part comprising a three-dimensional placeholder for the outboard and/or the inboard support cover. The placeholder may be at least one separate part or may be an integral part of the mold such that the mold corresponds locally to the contour of the wheel without the support cover(s). Placing fibers inside the mold in a predefined manner such that the reinforcing fibers at least partially encircle at least one placeholder, as described above. Closing the mold and introducing resin into the mold through injection openings. Curing of the resin and the therein embedded fibers. Opening the mold and removing the wheel from the mold. Preparing the surfaces of the wheel for the attachment of the support cover. Inserting the outboard and/or the inboard support cover into a respective recess of the wheel center. The outboard and/or the inboard support cover may be attached to the wheel center by an adhesive.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF SEVERAL VIEWS OF THE DRAWINGS

The herein described invention will be more fully understood from the detailed description given herein below and the accompanying drawings, which should not be considered limiting to the invention described in the appended claims. The drawings schematically show:

DETAILED DESCRIPTION OF THE INVENTION

Figure 1:
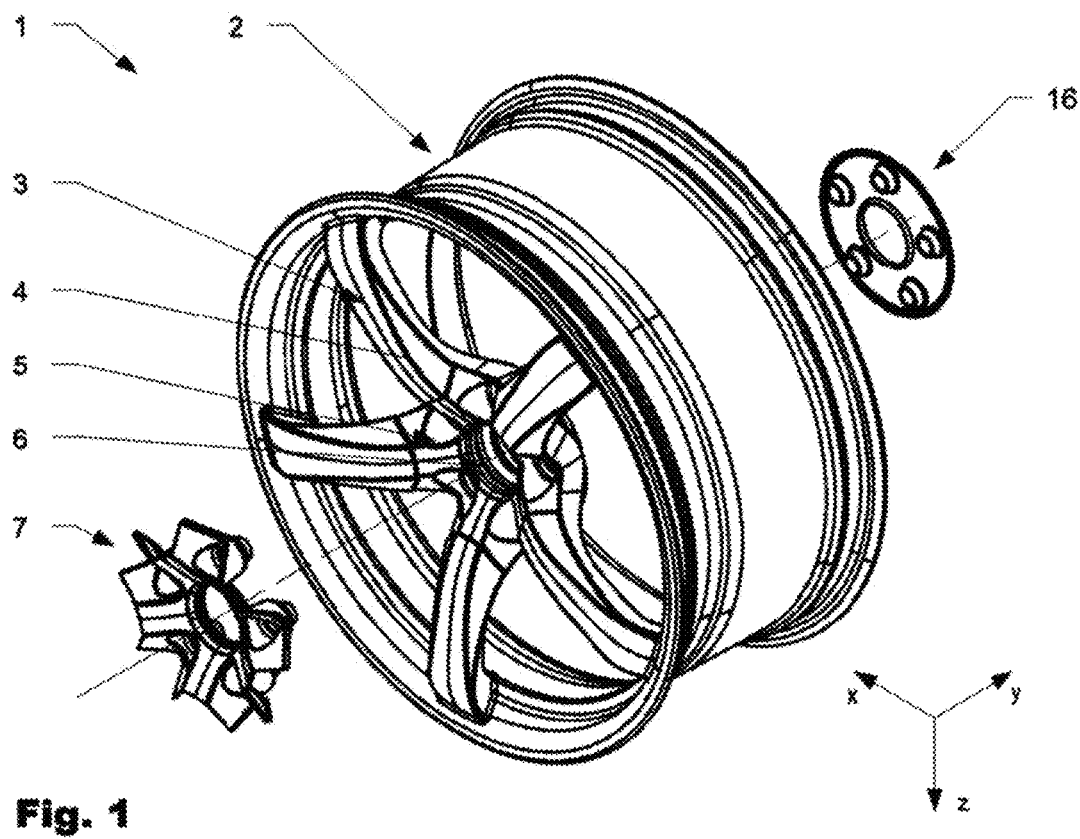
FIG. 1 is a perspective view of a variation of a wheel according to the present invention with an outboard and an inboard support cover partially disassembled.

Reference will now be made in detail to certain embodiments, examples of which are illustrated in the accompanying drawings, in which some, but not all features are shown. Indeed, embodiments disclosed herein may be embodied in many different forms and should not be understood as limited to the embodiments set forth herein; rather, these embodiments are provided so that this disclosure will satisfy applicable legal requirements. Whenever possible, like reference numbers will be used to refer to like components or parts.

FIGS. 1 to 6 show a first variation of a wheel 1 according to the present invention. The wheel 1 comprises a rim 2 and a wheel center 3 having several spokes 4 extending from a hub 5, comprising a center opening 6, radially outwards to the rim 2. The wheel center 3 is made from several layers of fiber-reinforced plastic material. The rim 2 has a rim well extending in transversal direction between an inboard flange and an outboard flange suitable to receive a tire (not shown) to be mounted thereon. The hub 5 is partially made from a fiber-reinforced plastic material and is covered on the outboard side from a three-dimensionally shaped support cover 7 made from metallic material. The hub 5 is intended to be interconnected with a vehicle (not shown) on the inboard side by means of wheel bolts/screws or similar fastening means (not shown) extending in the mounted state of the wheel on the vehicle through fastening openings 8 of the wheel 1.

The (outboard) support cover 7 encompasses the fastening openings 8 as well as the center opening 6. The three-dimensionally shaped support cover 7 further merges into at least one first bushing 9 which extends at least partially through the fiber-reinforced plastic material of the hub 5 in the transversal direction of the wheel towards the inboard side of the wheel. In the depicted variation a total of five first bushings 9 can be seen. However, another amount of first bushings 9 can be chosen.

The first bushings are arranged in respective bushing-openings 10 of the fiber-reinforced plastic material of the hub 5. The first bushings 9 have a (fusto-) conical first outer surface 11 which interacts in the mounted position with a corresponding first inner surface 12 of the bushing-opening in the fiber-reinforced material of the hub 5.

Figure 2:
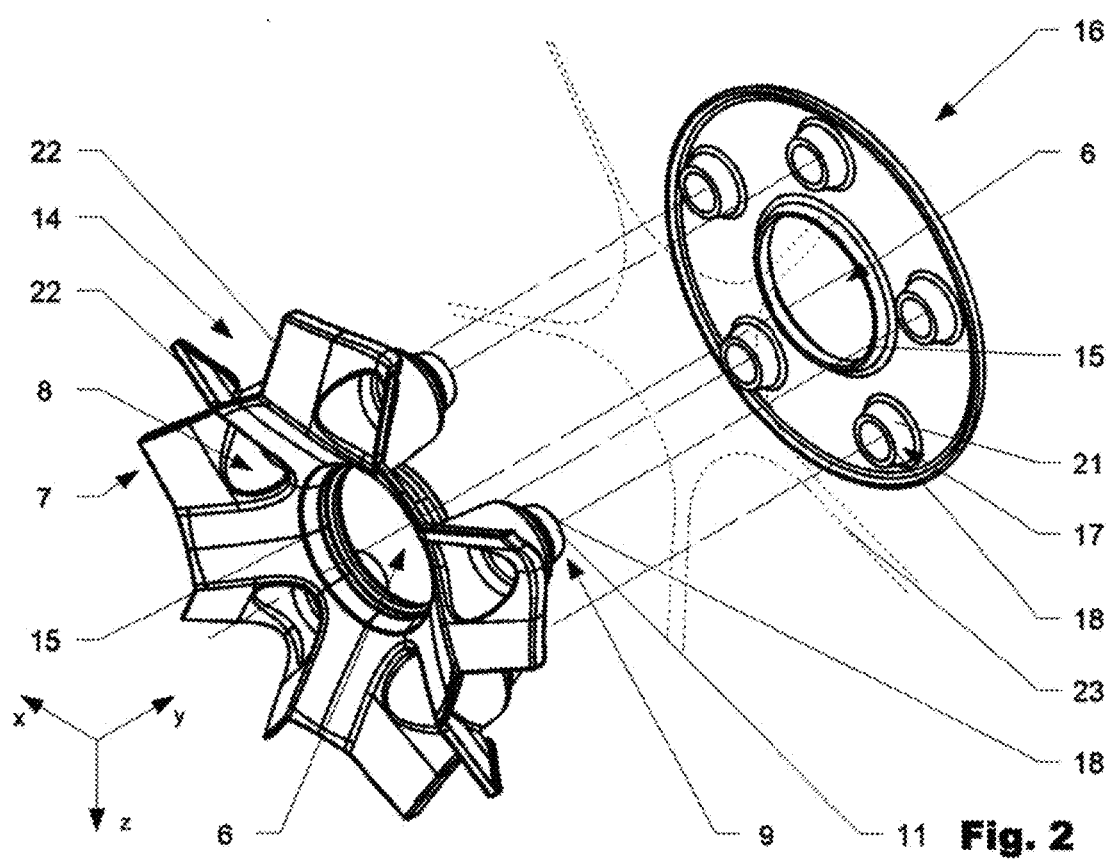
FIG. 2 is the outboard and inboard support cover according to FIG. 1.

Each first outer surface 11 is configured to apply an expanding force on the corresponding first inner surface 12 of the fiber-reinforced material of the hub 5 when the first bushing 9 is inserted into the bushing-opening 10. Thereby the bushing-openings 10 can be widened, which leads to a tensioning of the reinforcing fibers of the hub 5, partially encircling the at least one first bushing 9. Preferably, the reinforcing fibers arranged in the fiber-reinforced plastic material encircles the at least one first bushing 9 by at least 240°. The reinforcing fibers or fiber bundles 23 are schematically shown in FIG. 2. However, the fibers may also form a loop about the respective first bushing 9. The reinforcing fibers may further extend in radial direction of the wheel 1 through the spokes 4 towards the rim 2. The fibers may thereby extend in different spokes 4 or in the same spoke 4.

Figure 3:
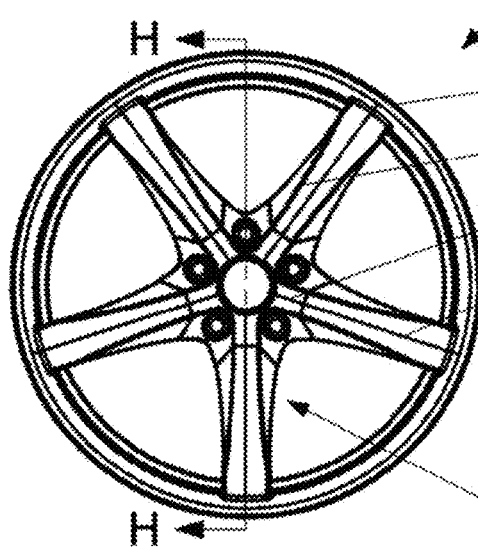
FIG. 3 is a front view of the wheel according FIG. 1 in an assembled state.
Figure 4:
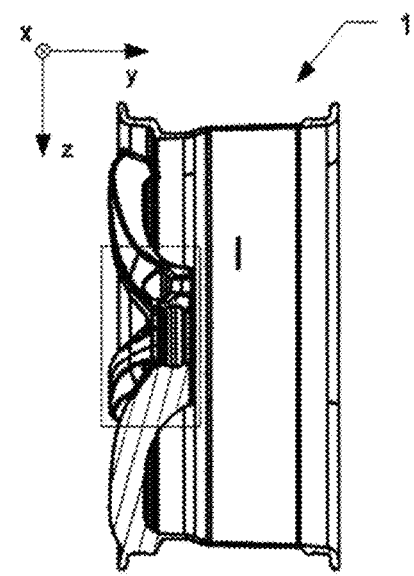
FIG. 4 is a cross-section H-H of FIG. 3.
Figure 5:
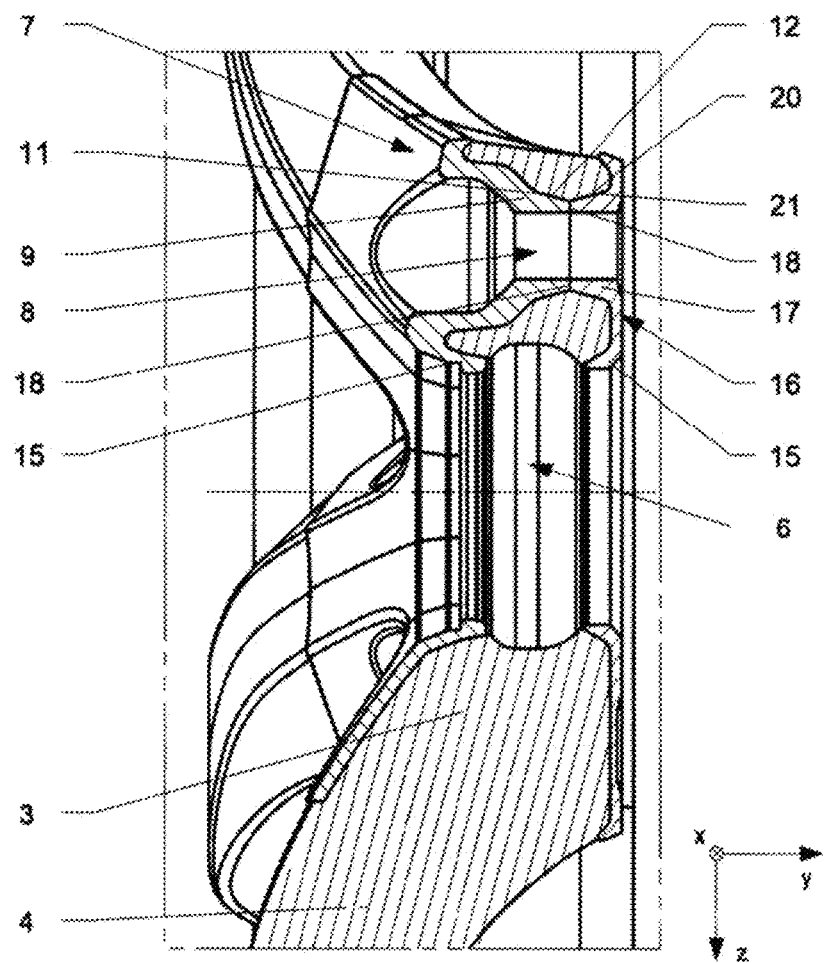
FIG. 5 is detail I of FIG. 4 in the assembled state.

FIG. 3 to FIG. 5 illustrate, that the three-dimensionally shaped support cover 7 is integrated into an outer contour of the hub 5. Therefore, the fiber-reinforced material of the hub 5 comprises an outboard recess 13 in which the three-dimensionally shaped support cover 7 is embedded (compare FIG. 6). The outboard recess 13 and thus the support cover 7 extends over the hub 5 and at least partially over the spokes 4. The support cover 7 comprises a center flange at least partially encompassing the center opening 6 of the wheel 1 and which is set back with respect to the channel like recesses 14. The center flange 15 extends into the center opening of the wheel center 3. The three-dimensionally shaped support cover 7 further comprises channel-like recesses 14 in which fiber-reinforced material is arranged extending from the hub 5 into the spokes 4 and supporting the fiber-reinforced material from the outside.

The hub 5 is further covered on the inboard side from an inboard support cover 16 also made from metallic material. The inboard cover 16 merges into at least one second bushing 17 extending at least partially through the fiber-reinforced plastic material of the hub 5 into the bushing-opening 10. Each outboard and inboard support cover 7, 16 are configured to be inserted with the respective (first and second) bushings into the bushing-openings 10 from different sides (outboard and inboard side of the wheel center) respectively. The at least one second bushing 17 has a (fusto-) conical second outer surface 21 which interacts in the mounted position with the second inner surface 20 of the fiber-reinforced material of the hub 5, corresponding to the (first) bushing 9 as explained above. The reinforcing fibers or fiber bundles 23 are schematically shown in FIG. 2 partially encompassing each of the first and/or the second bushing. However, the fibers may also form a loop about the respective first and/or the second bushing 9, 17 (not shown).

Figure 6:
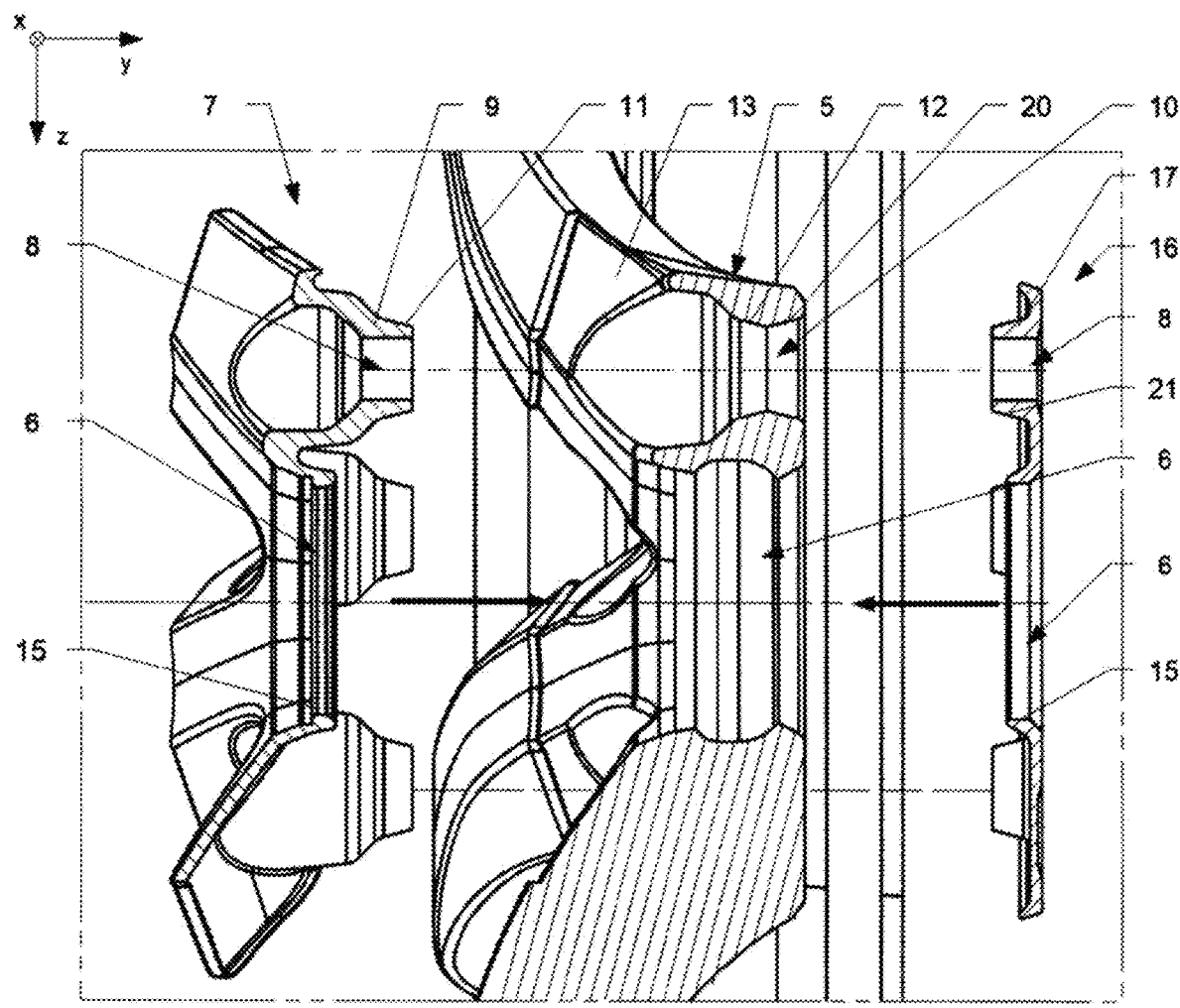
FIG. 6 is detail I of FIG. 4 in the partially disassembled state.

FIG. 5 is a detail of the sectionized view of the wheel 1 according to FIG. 4 in the assembled state and FIG. 6 a detail of the corresponding disassembled state. As can be seen, each first outer surface 11 of the first bushings 9 has a frusto-conical shape, which preferably has a first outer opening angle of about 15°. The corresponding first inner surface 12 also has a frusto-conical shape with an inner opening angle that is essentially equal to the outer opening angle. As well, each second outer surface 21 of the second bushings 16 has also a frusto-conical shape with a second outer opening angle that is about 15°. Each second inner surface 20 of the bushing-opening also has a frusto-conical shape with a second inner opening angle that is essentially equal to the second outer opening angle. However other shapes of the first and second bushings 9, 17 are also possible, as explained above.

The first bushings 9 each comprise a first front face 18 that in the assembled state abuts against a respective front faces 18 of the second bushings 17 (compare FIG. 6). The depicted first and second bushings 9, 17 have a straight ending abutting each other with the respective front faces 18. The front faces 18 may however also have corresponding concave/convex shapes.

The words used in the specification are words of description rather than limitation, and it is understood that various changes may be made without departing from the spirit and scope of the invention.

The invention claimed is:

1. A wheel (1) for a vehicle comprising:
   a. a rim (2); and
   b. a wheel center (3) comprising
      i. a plurality of spokes (4) extending from a hub (5) radially outwards to the rim (2), the hub (5) including a center opening (6), wherein
      ii. the hub (5) is made from a fiber-reinforced plastic material and is covered on the outboard side with a three-dimensionally shaped support cover (7) made from metallic material, wherein the three-dimensionally shaped support cover (7) is integrally formed with at least one first bushing (9) extending at least partially through the fiber-reinforced plastic material of the hub (5) and fibers arranged in the fiber-reinforced plastic material encircle at least partially the at least one first bushing (9).

2. The wheel (1) according to claim 1, wherein the hub (5) comprises fastening openings (8) which are arranged around the center opening (6) with the support cover (7) encompassing the fastening openings (8).

3. The wheel (1) according to claim 1, wherein the at least one first bushing (9) has a conical outer surface (11) which interacts in the mounted position with a corresponding inner surface (12) of the fiber-reinforced material of the hub (5).

4. The wheel (1) according to claim 1, wherein the reinforcing fibers further extend in radial direction of the wheel (1) through at least one spoke (4) towards the rim (200).

5. The wheel (1) according to claim 1, wherein the three-dimensionally shaped support cover (7) is integrated into the outer contour of wheel center (3).

6. The wheel (1) according to claim 1, wherein the fiber-reinforced material of the hub (5) comprises a recess (13) in which the three-dimensionally shaped support cover (7) is embedded.

7. The wheel (1) according to claim 1, wherein the three-dimensionally shaped support cover (7) extends at least partially into at least one of the spokes (4).

8. The wheel (1) according to claim 1, wherein the three-dimensionally shaped support cover (7) comprises channel-like recesses (14) in which the fiber-reinforced material is arranged extending from the hub (5) into the spokes (4) with undercuts on both side surfaces of the channel-like recesses (14).

9. The wheel (1) according to claim 8, wherein the three-dimensionally shaped support cover (7) comprises a center flange (15) at least partially encompassing the center opening (6) of the wheel (1) and which is set back with respect to the channel-like recesses (14).

10. The wheel (1) according to claim 1, wherein the hub (5) is covered on the inboard side with an inboard support cover (16) made from metallic material.

11. The wheel (1) according to claim 10, wherein the inboard support cover (16) is integrally formed with at least one second bushing (17) which extends at least partially through the fiber-reinforced plastic material of the hub (5) into the bushing-opening (10).

* * * * *